(12) United States Patent
Chen

(10) Patent No.: US 10,351,016 B1
(45) Date of Patent: Jul. 16, 2019

(54) BATTERY BOX OPENING STRUCTURE OF ELECTRIC VEHICLE

(71) Applicant: KWANG YANG MOTOR CO., LTD., Kaohsiung (TW)

(72) Inventor: Yi-Tso Chen, Kaohsiung (TW)

(73) Assignee: KWANG YANG MOTOR CO., LTD., Kaohsiung (TW)

(*) Notice: Subject to any disclaimer, the term of this patent is extended or adjusted under 35 U.S.C. 154(b) by 0 days.

(21) Appl. No.: 16/247,569

(22) Filed: Jan. 15, 2019

(30) Foreign Application Priority Data

Jan. 31, 2018 (TW) .............................. 107103526 A

(51) Int. Cl.
| | | |
|---|---|---|
| B60K 1/04 | (2019.01) | |
| B60L 50/64 | (2019.01) | |
| H01M 2/10 | (2006.01) | |
| B60L 50/60 | (2019.01) | |

(52) U.S. Cl.
CPC .............. B60L 50/64 (2019.02); B60K 1/04 (2013.01); B60L 50/66 (2019.02); H01M 2/1083 (2013.01); *B60K 2001/0416* (2013.01); *B60K 2001/0488* (2013.01)

(58) Field of Classification Search
CPC ................ B60K 1/04; B60K 2202/00; B60K 2001/0488; B60K 2001/0416; B60L 50/64; B60L 50/66; B60R 25/40; H01M 2/1083
See application file for complete search history.

(56) References Cited

U.S. PATENT DOCUMENTS

| | | | | |
|---|---|---|---|---|
| 5,207,288 A | * | 5/1993 | Ono ......................... | B62M 7/12 180/220 |
| 5,613,569 A | * | 3/1997 | Sugioka .................. | B60R 16/04 180/68.5 |
| 7,249,644 B2 | * | 7/2007 | Honda ..................... | B60K 1/00 180/65.51 |
| 8,590,656 B2 | * | 11/2013 | Tsai ........................ | B62K 19/30 180/219 |
| 2012/0000720 A1 | * | 1/2012 | Honda .................... | B62K 11/10 180/65.1 |
| 2014/0078249 A1 | * | 3/2014 | Wang ..................... | H04N 19/597 348/43 |

* cited by examiner

*Primary Examiner* — James A Shriver, II
*Assistant Examiner* — James J Triggs
(74) *Attorney, Agent, or Firm* — Leong C. Lei

(57) ABSTRACT

An electric vehicle includes a frame unit and a vehicle body cover unit. The frame unit includes tread tubes extending toward a rear side of a vehicle body. The tread tubes are arranged pairwise leftward and rightward as a left tread tube and a right tread tube. The vehicle body cover unit includes a tread board shielding the left tread tube and the right tread tube. A battery box that receives and holds a battery is shaft-supported on the frame unit. The battery box has two sides provided with support shafts. The battery box is shaft-supported on the frame unit by the support shafts in a left-right direction. The battery box is rotatable by a drive device about a rotation center defined by the support shafts in a front-rear direction to an open position or a storage position so as to facilitate removal of the battery from the battery box.

16 Claims, 8 Drawing Sheets

BATTERY BOX OPENING STRUCTURE OF ELECTRIC VEHICLE

TECHNICAL FIELD OF THE INVENTION

The present invention generally relates to a battery box opening structure of an electric vehicle, and more particularly to a battery box opening structure of an electric vehicle that eases lifting and removal of the battery from the electric vehicle and allows enlargement of the battery box and the battery.

DESCRIPTION OF THE PRIOR ART

An electric vehicle 1 is often provided with a receiving space 12 under a tread board 11 that is arranged for supporting user's feet to rest thereon. As shown in FIG. 1, the receiving space 12 receives and holds therein a battery 13 that supplies electrical power source to the electric vehicle 1.

As shown in FIGS. 1 and 2, the battery 13 is received and held in a battery box 14. The battery 13 exhibits certain weight and size. In addition, the electric vehicle 1 must has a predetermined height above the ground so that the battery 13, together with the battery box 14, is generally arranged in a lying condition in the receiving space 12 under the tread board 11. In order to provide the tread board 11 with a desired structural strength to support the user's feet resting thereon, a reinforcement member 15 is provided between the tread board 11 and the receiving space 12. Thus, with the arrangement of the reinforcement member 15, the structural strength of the tread board 11 is improved.

The known battery box 14 as described above, is effective in receiving and holding the battery 13 therein. When service, replacement, or withdrawal for re-charging of the battery 13 become necessary, the user has to remove the tread board 11 and the reinforcement member 15 first and then, the battery box 14 that is in a lying condition must be erected. In other words, the battery box 14 must be lifted to a condition of being generally perpendicular to the receiving space 12, and then, the user is allowed to lift and remove the battery 13 located in the battery box 14. Such a operation of first removing the tread board 11 and the reinforcement member 15 and then erecting the battery box 14 in order to lift and remove the battery 13 suffers, on the one hand, the engineering complexity of removing the tread board 11 and the reinforcement member 15, and, on the other hand, severe hindrance caused by an extremely small gap between the receiving space 12 and an outer circumference of the battery box 14. In addition, since the battery 13 located in the battery box 14 is of quite a weight, the operation of erecting the battery box 14 is generally difficult.

Thus, it is a challenge of the electric vehicle industry to provide a battery box structure of an electric vehicle that helps lift and remove a battery from an electric vehicle.

SUMMARY OF THE INVENTION

The primary objective of the present invention is to provide a battery box opening structure of an electric vehicle, which helps overcome the drawback of inconvenience of lifting and removing a battery from a battery box of an electric vehicle.

For such a purpose, the primary technical solution of the present invention as proposed in claim 1 is to provide a battery box opening structure of an electric vehicle, wherein the electric vehicle at least comprises a frame unit and a vehicle body cover unit; the frame unit comprises tread tubes extending toward a rear side of a vehicle body, the tread tubes being arranged in a left and right pairwise form as a left tread tube and a right tread tube; the vehicle body cover unit at least comprises a tread board that shields the left tread tube and the right tread tube; a battery box is received under the tread board and the battery box receives and holds a battery, characterized in that the battery box has two sides that are provided with support shafts, and the battery box are shaft-supported on the left tread tube and the right tread tube by the support shafts in a vehicle body left-right direction; the battery box is provided on one side thereof with a drive device that is operable to drive the battery box to rotate about a rotation center defined by the support shafts in a vehicle body front-rear direction to an open position or a storage position.

For such a purpose, the primary technical solution of the present invention as proposed in claim 2 is to provide a battery box opening structure of the electrical vehicle, wherein the drive device is located between the battery box and the tread tubes.

For such a purpose, the primary technical solution of the present invention as proposed in claim 3 is to provide a battery box opening structure of the electrical vehicle, wherein the drive device comprises a power unit and a driven element drivable by the power unit; and the power unit is arranged on the tread tubes and the driven element is arranged at one side of a circumference of the battery box.

For such a purpose, the primary technical solution of the present invention as proposed in claim 4 is to provide a battery box opening structure of the electrical vehicle, wherein the power unit comprises a power motor section and a transmission section, a transmission gear being arranged at an outside of the transmission section, and the driven element is in engagement with the transmission gear of the transmission section.

For such a purpose, the primary technical solution of the present invention as proposed in claim 5 is to provide a battery box opening structure of the electrical vehicle, wherein the driven element comprises a curved toothed rack.

For such a purpose, the primary technical solution of the present invention as proposed in claim 6 is to provide a battery box opening structure of the electrical vehicle, wherein the left tread tube comprises a left shaft support section and the right tread tube comprises a right shaft support section, and the left shaft support section and the right shaft support section receive the support shafts of the battery box to be shaft-supported thereon.

For such a purpose, the primary technical solution of the present invention as proposed in claim 7 is to provide a battery box opening structure of the electrical vehicle, wherein the support shafts of the battery box are located above a battery box center axis of the battery box extending in the vehicle body front-rear direction.

For such a purpose, the primary technical solution of the present invention as proposed in claim 8 is to provide a battery box opening structure of the electrical vehicle, wherein the drive device has an electrical power source supplied with a second battery.

For such a purpose, the primary technical solution of the present invention as proposed in claim 9 is to provide a battery box opening structure of the electrical vehicle, wherein the tread board is entirely or partly fixed to an upper side surface of the battery box; a bottom cover is entirely or partly fixed to a lower side surface of the battery box; the tread board fixed to the upper side surface of the battery box and the bottom cover fixed to the lower side surface of the battery box are openable in synchronization with the battery box, so that when the battery box is opened to a condition of being generally at a right angle with respect to a ground surface, a left end of the battery box projects beyond a lower edge of an original location of the bottom cover in a direction toward the ground surface.

For such a purpose, the primary technical solution of the present invention as proposed in claim 10 is to provide a battery box opening structure of the electrical vehicle, wherein the drive device, the battery box, and the tread tubes overlap each other when viewed in a lateral side.

For such a purpose, the primary technical solution of the present invention as proposed in claim 11 is to provide a battery box opening structure of the electrical vehicle, wherein the left tread tube, the right tread tube, the tread board and the bottom cover define a receiving space, and the receiving space receives the battery box therein.

The efficacy that the primary technical solution of the present invention proposed in claim 1 may achieve is that the battery box is rotatable about a rotation center defined by the support shafts in a vehicle body front-rear direction to open position so that lifting and removal of a battery from the battery box is made easy.

The efficacy that the primary technical solution of the present invention proposed in claim 2 may achieve is that installation of the drive device is made easy.

The efficacy that the primary technical solution of the present invention proposed in claim 3 may achieve is that installation of the drive device is made easy.

The efficacy that the primary technical solution of the present invention proposed in claim 4 may achieve is that an effect of opening achieved with the drive device is ensured.

The efficacy that the primary technical solution of the present invention proposed in claim 5 may achieve is that reliability of operation of the drive device is enhanced.

The efficacy that the primary technical solution of the present invention proposed in claim 6 may achieve is that rotatable arrangement of the battery box is made easy.

The efficacy that the primary technical solution of the present invention proposed in claim 7 may achieve is that opening of the battery box is made easy.

The efficacy that the primary technical solution of the present invention proposed in claim 8 may achieve is that the stability of electrical power supply of the drive device can be ensured.

The efficacy that the primary technical solution of the present invention proposed in claim 9 may achieve is that withdrawal of the battery from the battery box by a user is made easy.

The efficacy that the primary technical solution of the present invention proposed in claim 10 may achieve in that, on the one hand, installation of the drive device is made easy and, on the other hand, the receiving space can be effectively used to thereby make interior arrangement of the receiving space more compact.

The efficacy that the primary technical solution of the present invention proposed in claim 11 may achieve is that a space of the electric vehicle can be fully used and the battery received in the battery box is provided with a feature of shielding.

DETAILED DESCRIPTION OF THE PREFERRED EMBODIMENTS

Figure 1:
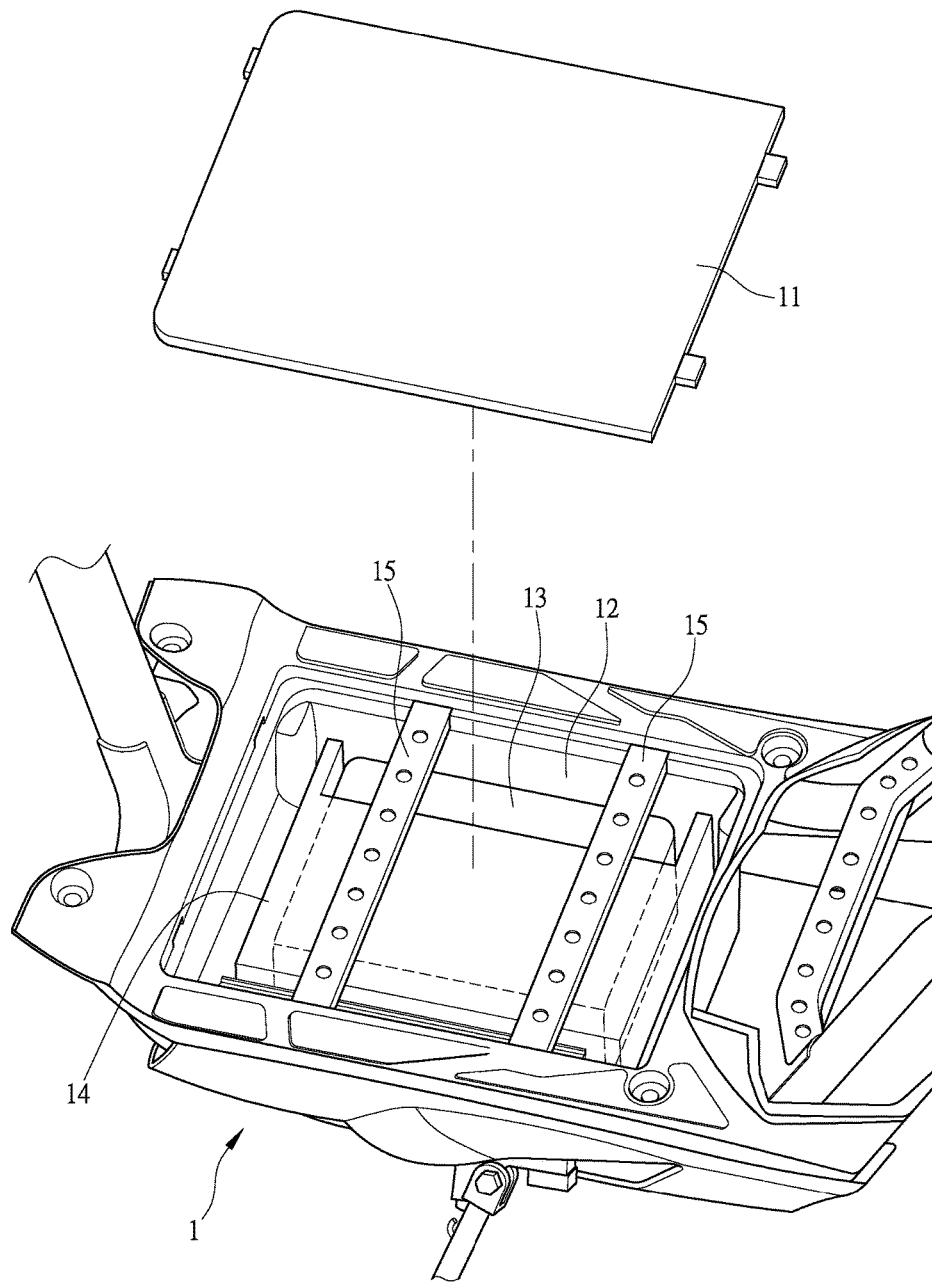
FIG. 1 is a schematic view illustrating a conventional electric vehicle battery box.
Figure 2:
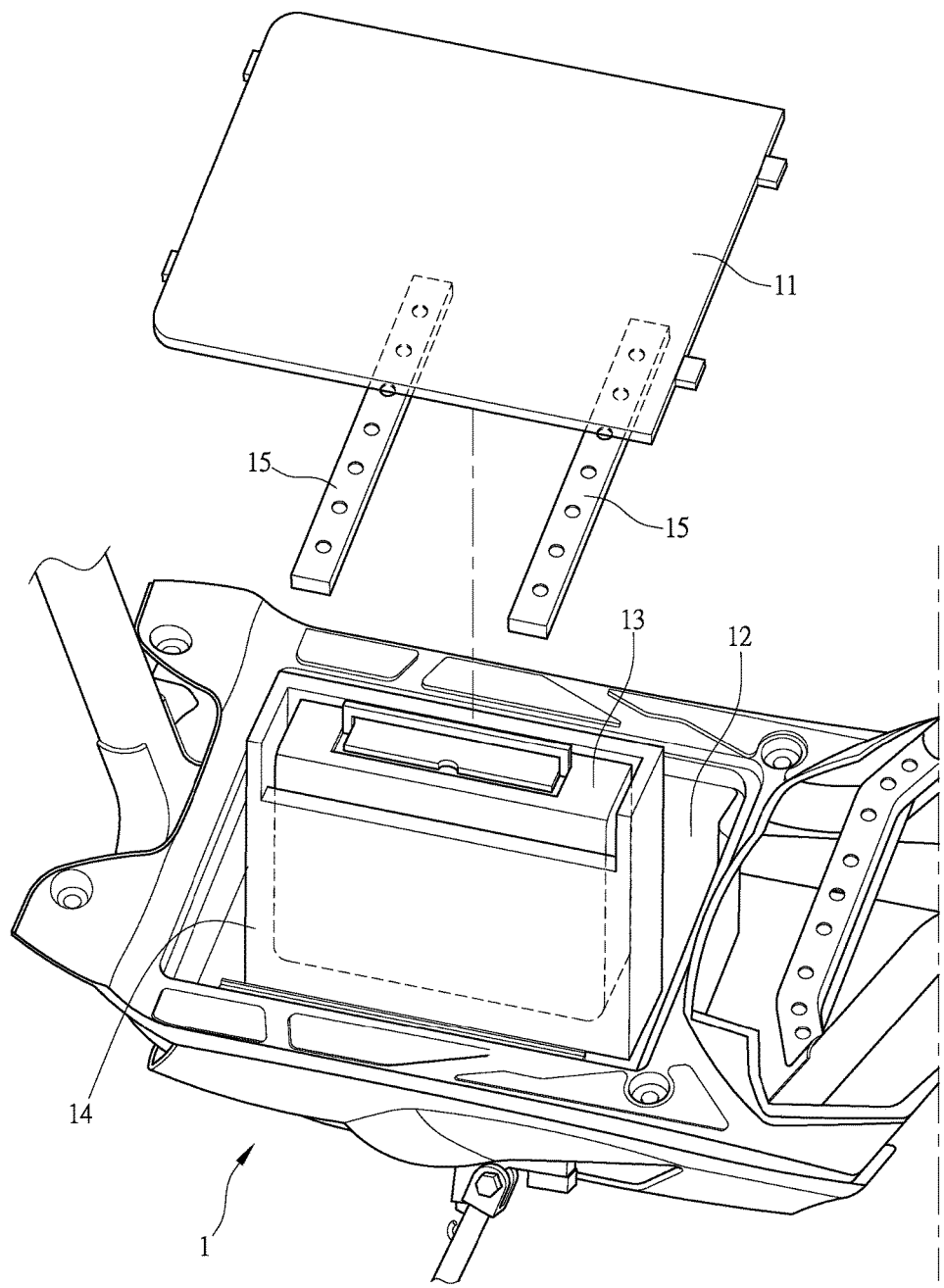
FIG. 2 is a schematic view illustrating withdrawal of the conventional electric vehicle battery box.
Figure 3:
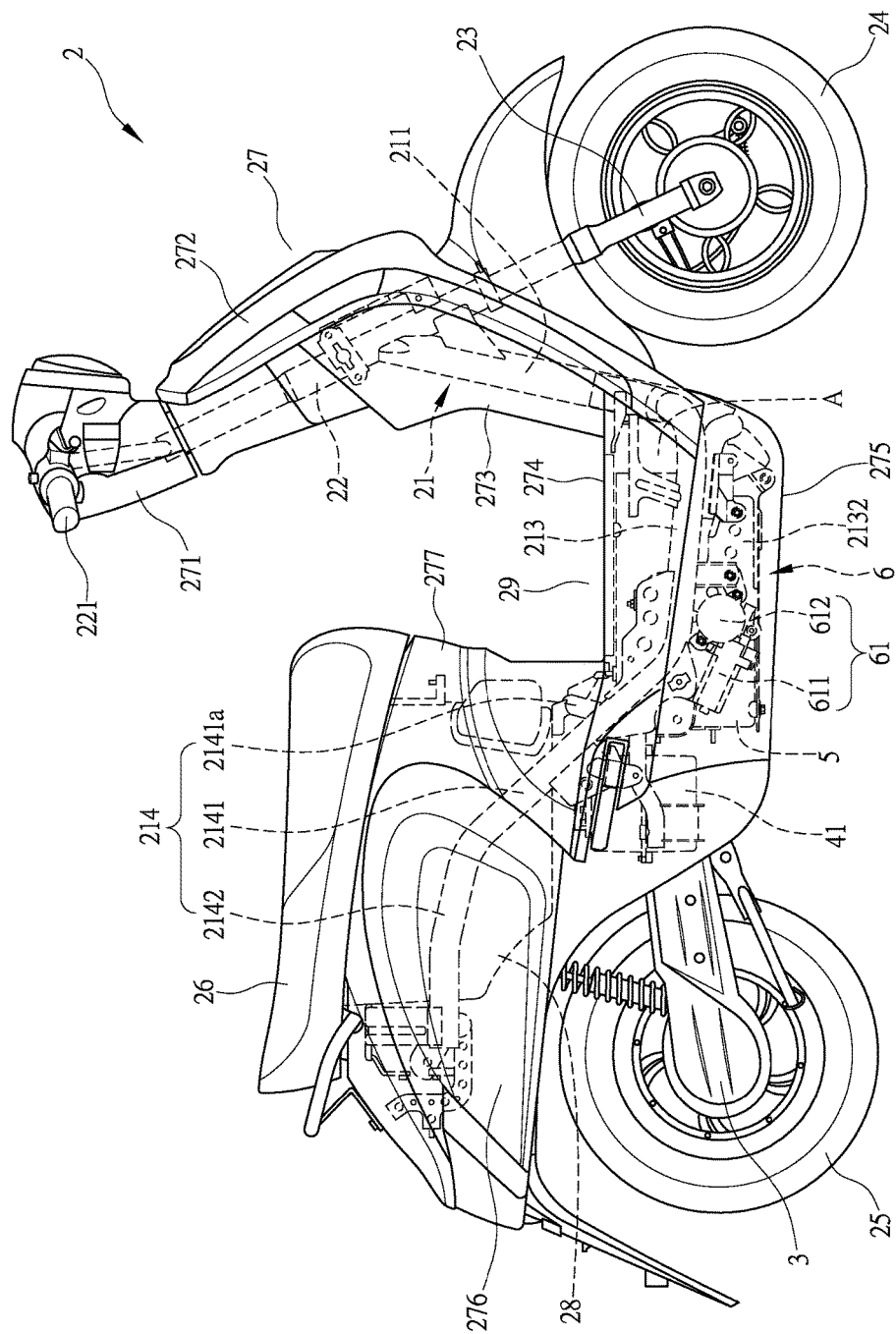
FIG. 3 is a side elevational view illustrating an electric vehicle according to the present invention.
Figure 4:
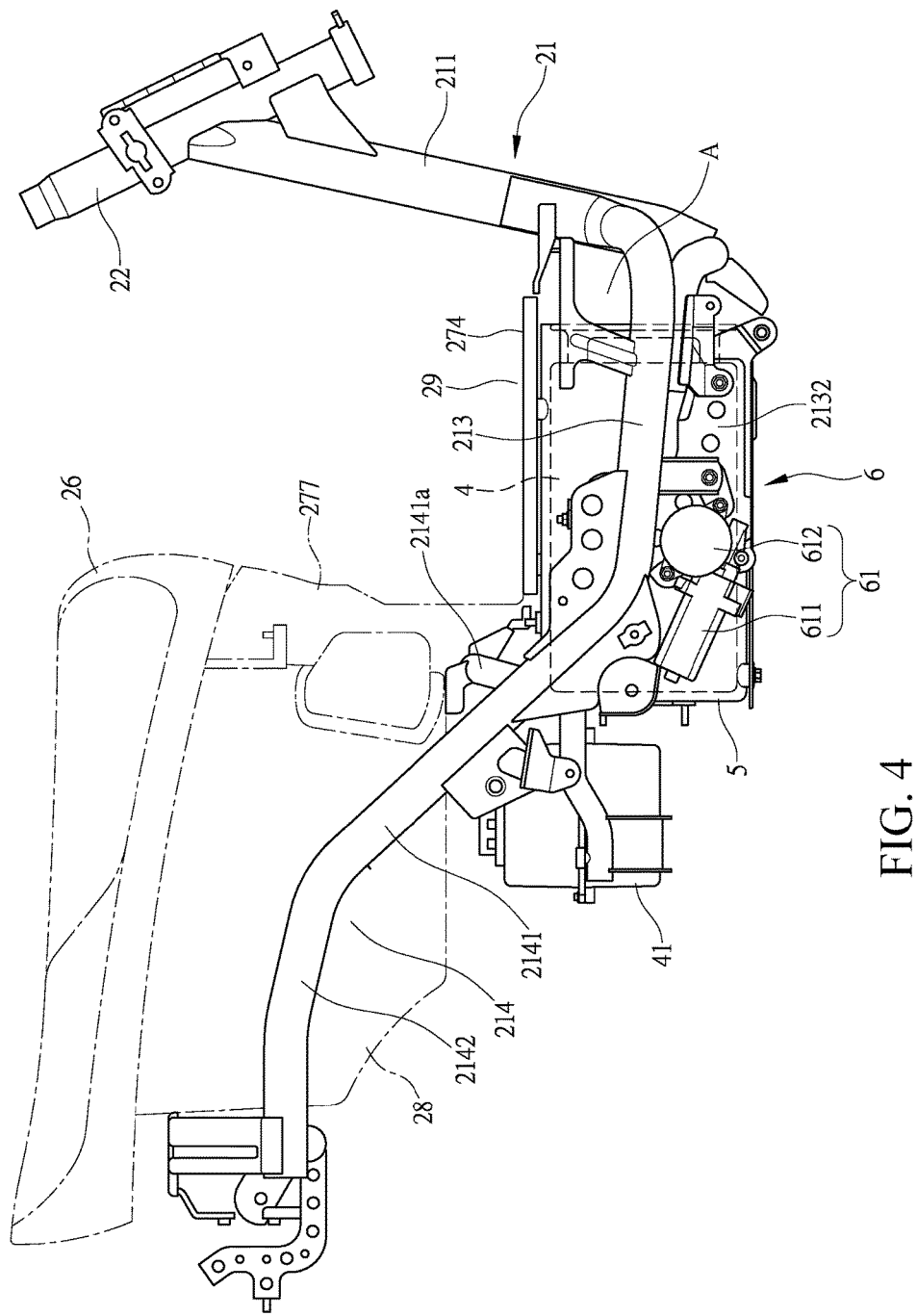
FIG. 4 is a schematic view illustrating an arrangement of a battery box of the electric vehicle according to the present invention.
Figure 5:
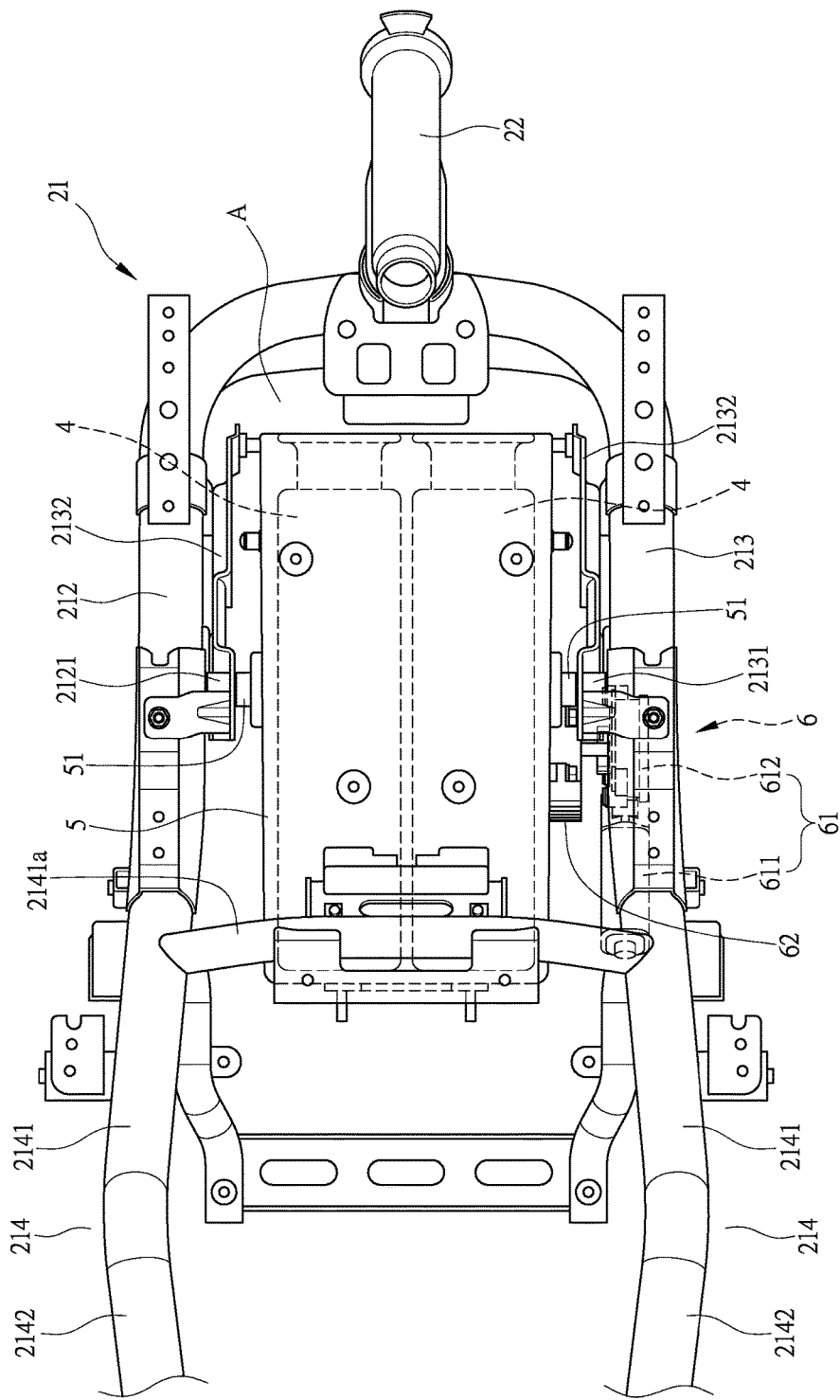
FIG. 5 is a top plan view illustrating the arrangement of the battery box of the electric vehicle according to the present invention.
Figure 6:
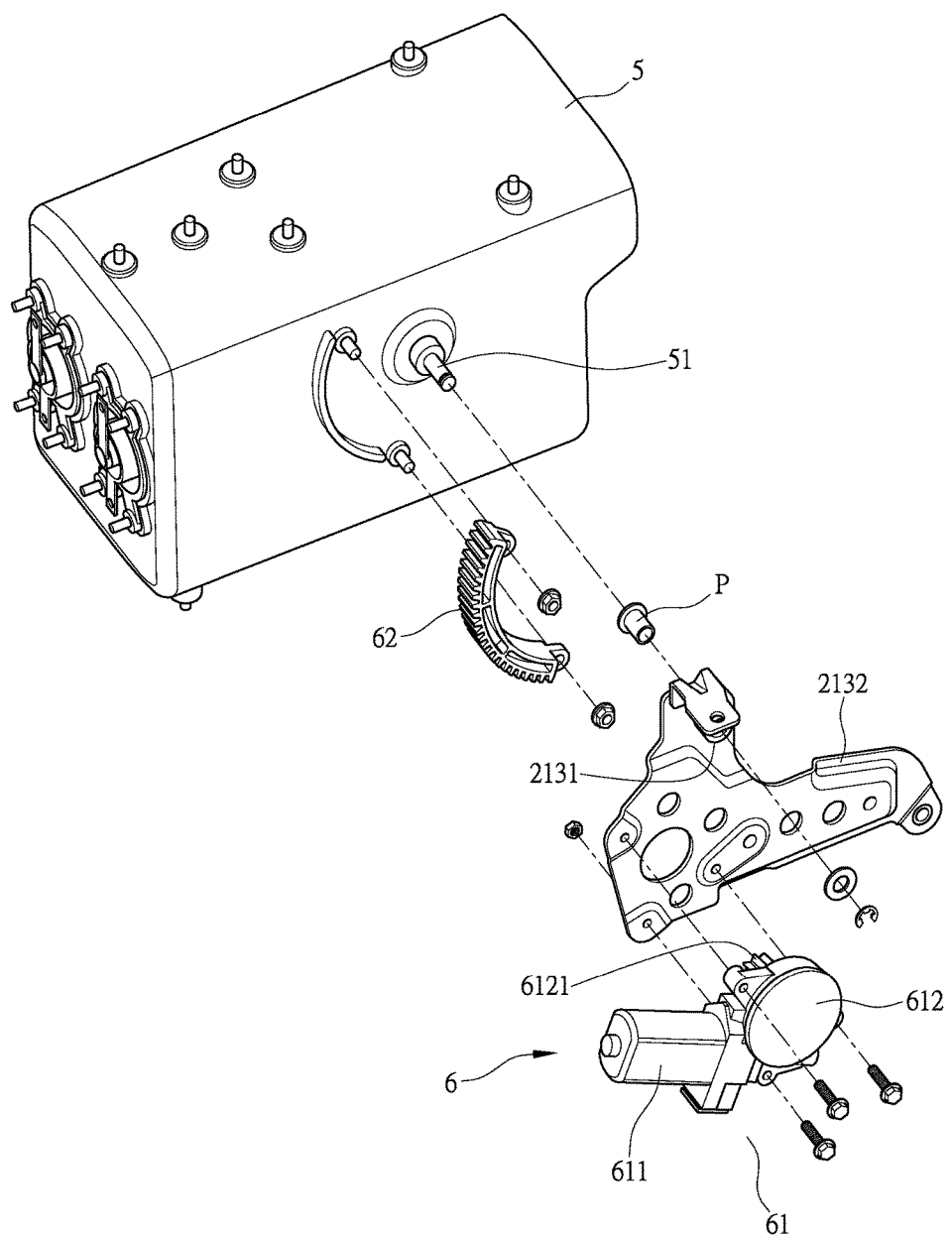
FIG. 6 is an exploded view of the battery box and a drive device according to the present invention.
Figure 7:
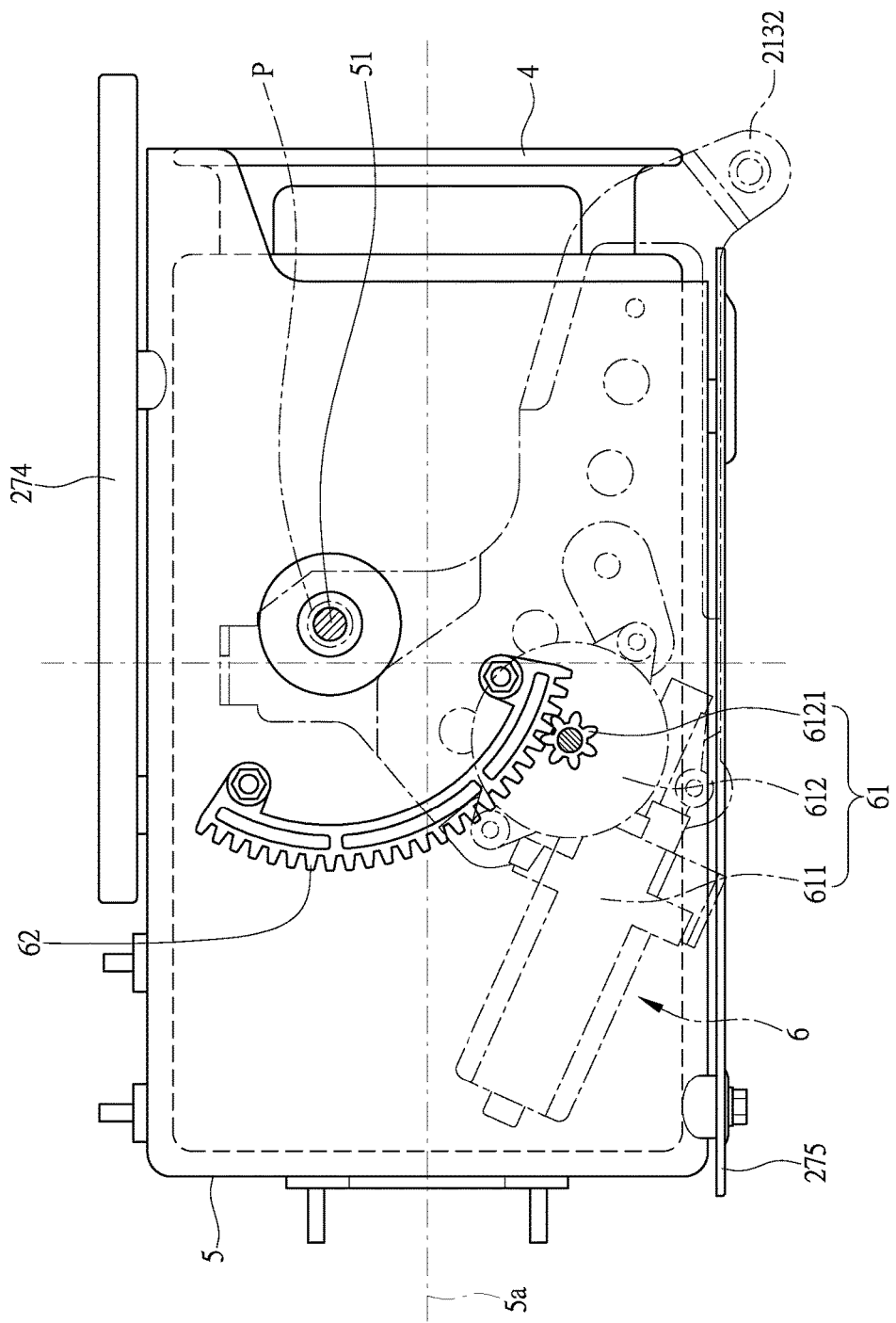
FIG. 7 is an assembled view of the battery box and the drive device according to the present invention.
Figure 8:
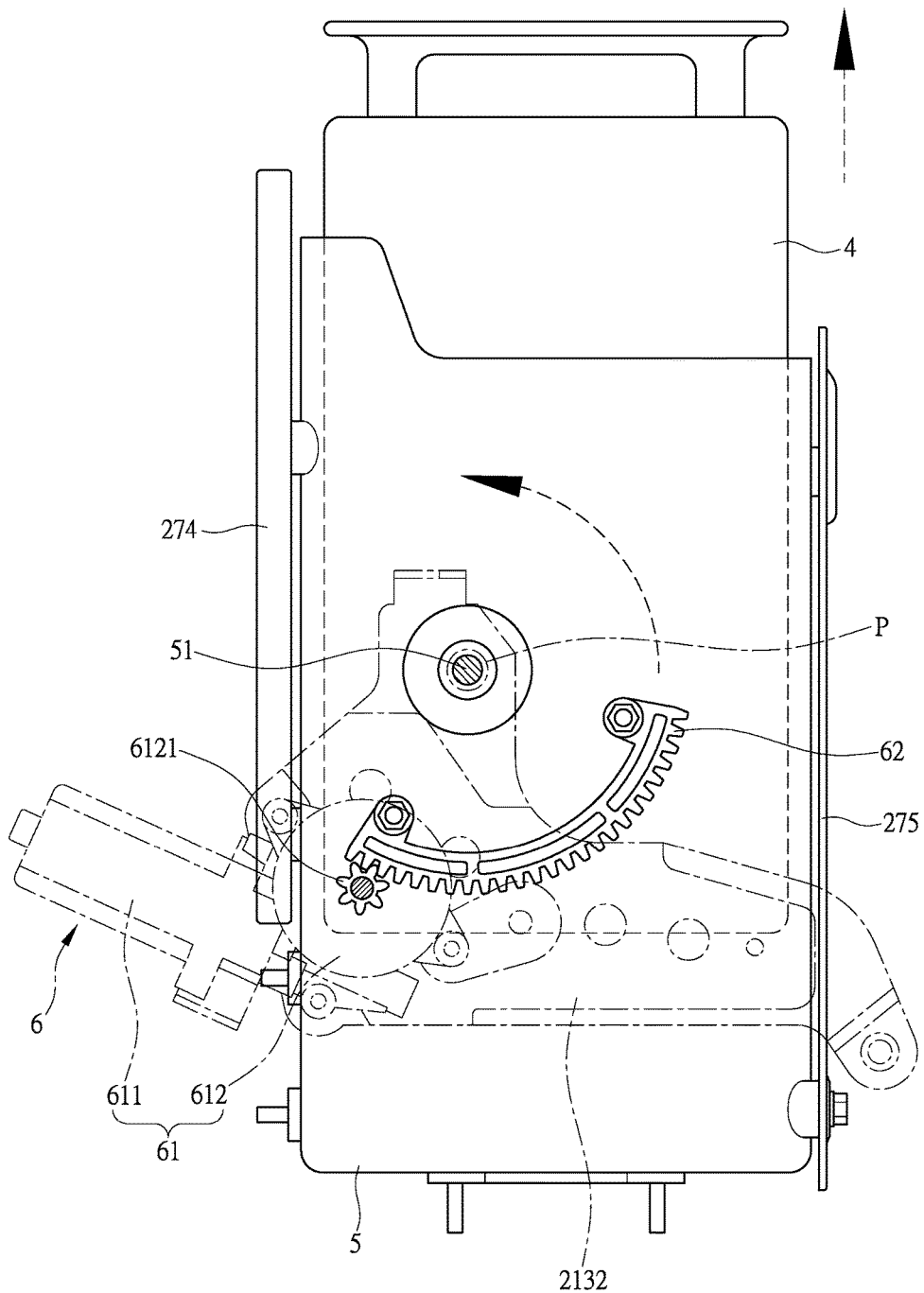
FIG. 8 is a schematic view illustrating an opening operation of FIG. 7.

Firstly, referring to FIGS. 3, 4, and 5, the present invention provides a battery box opening structure of an electric vehicle. A frame unit 21 of the electric vehicle 2 is provided, at a front side, with a head tube 22. The head tube 22 is provided, at an upper side thereof, with a steering mechanism 221. The steering mechanism 221 is connected, at a lower side thereof, to a front fork unit (front shock absorber) 23. The front fork unit 23 is provided, at a lower side thereof and in a rotatable manner, with a front wheel 24. The frame unit 21 is provided with a main tube 211 extending from the head tube 22 in a direction toward a rear side of a vehicle body. The main tube 211 is provided, as being further extended toward the rear side of the vehicle body, with tread tubes. The tread tubes are arranged pairwise in a left-right direction as a left tread tube 212 and a right tread tube 213. The left tread tube 212 and the right tread tube 213 are provided with rear frames 214 that are arranged pairwise in the left-right direction and extend toward the rear side of the vehicle body. The rear frames 214 comprise a rise section 2141 and a side frame section 2142. A transverse tube 2141*a* is arranged between the rise sections 2141. A rear wheel 25 is arranged rearward of and under the rear frames 214. A driving motor 3 is arranged at one side of the rear wheel 25 such that the driving motor 3 is operable to drive the rear wheel 25 in order to cause the electric vehicle 2 to more forward. A seat section 26 that is located above the rear wheel 25 is arranged rearward of the steering mechanism 221 such that a spacing distance is provided between the seat section 26 and the steering mechanism 221. The electric vehicle 2 is provided, on an outside circumference thereof, with a vehicle body cover unit 27. The vehicle body cover unit 27 comprises a head cover 271 housing the steering mechanism 221, a front head cover 272 arranged at a lower side of the head cover 271 and housing a front end of the vehicle body, and a knee-shielding cover 273 arranged at a rear side of the front head cover 272. A tread board 274 is arranged between the steering mechanism 221 and the seat section 26 at a lower side thereof. A bottom cover 275 is arranged at a lower side of the tread board 274. The electric vehicle 2 is provided, on two sides thereof, with side vehicle body covers 276 at a lower side of the seat section 26. A central vehicle body cover 277 is provided in front of and at a lower side of the seat section 26. An article storage box 28 is provided at a lower side of the seat section 26 and an upper side of the article storage box 28 is shielded by the seat section 26. The electric vehicle 2 is provided with a power source, of which an example that is shown in the drawings includes a driving motor 3 driving the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 3, 4, and 5, the tread board 274 forms a foot support section 29, and the foot support section 29 functions to receive a rider's feet to place thereon. The tread board 274, the bottom cover 275, and the left tread tube 212 and the right tread tube 213 define a receiving space A. The receiving space A receives therein a battery box 5 that receives and holds therein a battery 4. The battery 4 is electrically connected with the driving motor 3, in order to provide electrical power to the driving motor 3 to drive the rear wheel 25 to rotate. As such, a control device (not shown in the drawings) provided on the steering mechanism 221 can be operated to activate the driving motor 3 to drive the rear wheel 25 to rotate so as to cause the electric vehicle 2 to move.

As shown in FIGS. 3, 4, 5, 6, and 7, the battery 4 is received in a battery box 5. The battery box 5 is received in the receiving space A defined by the tread board 274, the bottom cover 275, the left tread tube 212 and the right tread tube 213 in a manner of being arranged in a vehicle body front-rear direction of the electric vehicle 2. The left tread tube 212 is provided with a left shaft support section 2121; and the right tread tube 213 is provided with a right shaft support section 2131. The battery box 5 is provided, on two opposite sides thereof, with support shafts 51 projecting therefrom in a vehicle body left-right direction. The support shafts 51 that are arranged on the two sides of the battery box 5 are arranged above a battery box center axis 5a of the battery box 5 that extends in the vehicle body front-rear direction. As such, the battery box 5 is supported by the support shafts 51, in a manner of being shaft-supported in the vehicle body left-right direction, on the left shaft support section 2121 of the left tread tube 212 and the right shaft support section 2131 of the right tread tube 213. More specifically speaking, the support shafts 51 are arranged to penetrate through and extend beyond sleeves P to be shaft-supported in the left shaft support section 2121 and the right shaft support section 2131. The tread board 274 is entirely or partly fixed to an upper surface of the battery box 5; and the bottom cover 275 is entirely or partly fixed to a lower surface of the battery box 5. One side of the battery box 5 is provided with a drive device 6.

As shown in FIGS. 4, 5, 6, 7, and 8, the drive device 6 is arranged between the battery box 5 and the right tread tube 213, and as viewed in a lateral side, the drive device 6, the battery box 5, and the right tread tube 213 overlap each other, such that, on the one hand, the installation of the drive device 6 is made easy, and on the other hand, the receiving space A can be effectively used to thereby make interior arrangement of the receiving space A more compact. The drive device 6 comprises a power unit 61 and a driven element 62 that can be driven by the power unit 61. The power unit 61 is fixed to a mounting and retention brace 2132 extended downward from the right tread tube 213. The right shaft support section 2131 is mounted on the mounting and retention brace 2132. The support shaft 51 of the battery box 5 penetrates through the sleeve P and is shaft-supported in the right shaft support section 2131. The power unit 61 comprises a power motor section 611 and a transmission section 612. The power unit 61 can be activated by a control button (not shown in the drawings) provided on the steering mechanism 221. Power is supplied from the power motor section 611 to the transmission section 612 and is then outputted from a transmission gear 6121 arranged at an outside of the transmission section 612. The driven element 62 comprises a toothed member, or more precisely, a curved toothed rack. The driven element 62 is mounted to either one of a left side and a right side of the battery box 5, and the right side is taken as an example as shown in the drawings for illustration. The driven element 62 is set in engagement with the transmission gear 61216 of the transmission section 612 of the power unit 61. An electrical power source of the drive device 6 is supplied with a second battery 42 arranged at a lower side of a front portion of the article storage box 28. When a user intends to open the battery box 5 for lifting and removing the battery 4, the user may operate the control button provided on the steering mechanism 221 to control the second battery 41 to supply electrical power to the drive device 6 so that the power motor section 611 of the power unit 61 of the drive device 6 is activated. As such, the power motor section 611 puts the transmission section 612 into operation and the transmission section 612 causes the transmission gear 6121 outside the transmission section 612 to rotate. Since the transmission gear 6121 is in mating engagement with the driven member 62 located outside the battery box 5, the driven member 62 is driven by the transmission gear 6121 to operate so as to cause the battery box 5 to rotate, about a rotation center defined by the support shafts 51, toward the vehicle body front-rear direction, to an open position or a storage position in order to be opened in a condition of generally defining a right angle with respect to a ground surface, thereby allowing the user to lift and remove the battery 4 from the battery box 5. The drive device 6 can be arranged at the left side or the right side of the battery box 5 (wherein the terms "front", "rear", "left", and "right" as used in this invention are defined as follows: the left side, the right side, the front side, and the rear side respectively refer to the left hand side, the right hand side, the front side, and the rear side of a person sitting on the seat section), and in other words, the drive device 6 can be arranged on the left tread tube 212 or the right tread tube 213. Being arranged on the right tread tube 213 is taken as an example for illustration in the instant embodiment; however, this invention is not limited to such a way of embodiment.

The primary efficacy of the present invention is that the two sides of the battery box 5 are provided with the support shafts 51 and the battery box 5 is shaft-supported by the support shafts 51 on the left tread tube 212 and the right tread tube 213 in the vehicle body left-right direction, and the drive device 6 is arranged at one side of the battery box 5 to drive the battery box 5 to rotate about a rotation center defined by the support shafts 51 for opening in the vehicle body front-rear direction, so that lifting and removal of the battery 4 from the battery box 5 is made easy.

The second efficacy of the present invention is that the drive device 6 is arranged at a location between the battery box 5 and the right tread tube 213, so that installation of the drive device 6 is made easy.

The third efficacy of the present invention is that the drive device 6 is arranged at one side of the battery box 5 and the drive device 6 comprises a power unit 61 and a driven element 62 that can be driven by the power unit 61; the power unit 61 is arranged on the right tread tube 213 and the driven element 62 is arranged on one side of a circumference of the battery box 5, so that installation of the drive device 6 is made easy.

The fourth efficacy of the present invention is that the power unit 61 comprises a power motor section 611 and a transmission section 612, and the driven element 62 is in engagement with a transmission gear 6121 of the transmission section 612, so that an effect of opening achieved with the drive device 6 is ensured.

The fifth efficacy of the present invention is that the driven element 62 comprises a curved toothed rack, so that reliability of operation of the drive device 6 is enhanced.

The sixth efficacy of the present invention is that the left tread tube 212 is provided with a left shaft support section 2121 and the right tread tube 213 is provided with a right shaft support section 2131; and the left shaft support section 2121 and the right shaft support section 2131 allow the support shafts 51 of the battery box 5 to be shaft-supported thereon so that pivotal arrangement of the battery box 5 is made easy.

The seventh efficacy of the present invention is that the support shafts 51 of the battery box 5 are located above a battery box center axis 5a of the battery box 5 in a vehicle body front-rear direction so that opening of the battery box 5 is made easy.

The eighth efficacy of the present invention is that the electrical power supply to the drive device 6 is made with a second battery 41 so that stability of electrical power supply of the drive device 6 can be ensured.

The ninth efficacy of the present invention is that the tread board 274 is entirely or partly fixed to an upper side surface of the battery box 5; the bottom cover 275 is entirely or partly fixed to a lower side surface of the battery box 5; the tread board 274 that is fixed to the upper side surface of the battery box 5 and the bottom cover 275 that is fixed to the lower side surface of the battery box 5 are openable in synchronization with the battery box 5 and thus, when the battery box 5 is opened in a condition of being generally at a right angle with respect to the ground surface, the left end of the battery box 5 projects beyond a lower edge of an original location of the bottom cover 257 in a direction toward the ground surface, so that withdrawal of the battery 4 from the battery box 5 by a user is made easy.

The tenth efficacy of the present invention is that the drive device is arranged between the battery box 5 and the right tread tube 213 and as viewed in a lateral side, the drive device 6, the battery box 5, and the right tread tube 213 overlap each other so that, on the one hand, installation of the drive device 6 is made easy and, on the other hand, a receiving space A can be effectively used to thereby make interior arrangement of the receiving space A more compact.

The eleventh efficacy of the present invention is that the left tread tube 212, the right tread tube 213, the tread board 274 and the bottom cover 275 define a receiving space A, and the receiving space A receives and holds the battery box 5 therein, so that a space of the electric vehicle 2 can be fully used and the battery 4 received in the battery box 5 is provided with a feature of shielding.

I claim:

1. A battery box opening structure of an electric vehicle, wherein the electric vehicle at least comprises a frame unit and a vehicle body cover unit; the frame unit comprises tread tubes extending toward a rear side of a vehicle body, the tread tubes being arranged in a left and right pairwise form as a left tread tube and a right tread tube; the vehicle body cover unit at least comprises a tread board that shields the left tread tube and the right tread tube; a battery box is received under the tread board and the battery box receives and holds a battery, characterized in that the battery box has two sides that are provided with support shafts, and the battery box are shaft-supported on the left tread tube and the right tread tube by the support shafts in a vehicle body left-right direction; the battery box is provided on one side thereof with a drive device that is operable to drive the battery box to rotate about a rotation center defined by the support shafts in a vehicle body front-rear direction to an open position or a storage position.

2. The battery box opening structure of the electrical vehicle according to claim 1, wherein the drive device is located between the battery box and the tread tubes.

3. The battery box opening structure of the electric vehicle according to claim 1, wherein the drive device comprises a power unit and a driven element drivable by the power unit; and the power unit is arranged on the tread tubes and the driven element is arranged at one side of a circumference of the battery box.

4. The battery box opening structure of the electric vehicle according to claim 3, wherein the power unit comprises a power motor section and a transmission section, a transmission gear being arranged at an outside of the transmission section, and the driven element is in engagement with the transmission gear of the transmission section.

5. The battery box opening structure of the electric vehicle according to claim 3, wherein the driven element comprises a curved toothed rack.

6. The battery box opening structure of the electric vehicle according to claim 1, wherein the left tread tube comprises a left shaft support section and the right tread tube comprises a right shaft support section, and the left shaft support section and the right shaft support section receive the support shafts of the battery box to be shaft-supported thereon.

7. The battery box opening structure of the electric vehicle according to claim 1, wherein the support shafts of the battery box are located above a battery box center axis of the battery box extending in the vehicle body front-rear direction.

8. The battery box opening structure of the electric vehicle according to claim 1, wherein the drive device has an electrical power source supplied with a second battery.

9. The battery box opening structure of the electric vehicle according to claim 1, wherein the tread board is entirely or partly fixed to an upper side surface of the battery box; a bottom cover is entirely or partly fixed to a lower side surface of the battery box; the tread board fixed to the upper side surface of the battery box and the bottom cover fixed to the lower side surface of the battery box are openable in synchronization with the battery box, so that when the battery box is opened to a condition of being generally at a right angle with respect to a ground surface, a left end of the battery box projects beyond a lower edge of an original location of the bottom cover in a direction toward the ground surface.

10. The battery box opening structure of the electric vehicle according to claim 2, wherein the drive device, the battery box, and the tread tubes overlap each other when viewed in a lateral side.

11. The battery box opening structure of the electric vehicle according to claim 1, wherein the left tread tube, the right tread tube, the tread board and the bottom cover define a receiving space, and the receiving space receives the battery box therein.

12. The battery box opening structure of the electric vehicle according to claim 2, wherein the drive device comprises a power unit and a driven element drivable by the power unit; and the power unit is arranged on the tread tubes and the driven element is arranged at one side of a circumference of the battery box.

13. The battery box opening structure of the electric vehicle according to claim 12, wherein the power unit comprises a power motor section and a transmission section, a transmission gear being arranged at an outside of the transmission section, and the driven element is in engagement with the transmission gear of the transmission section.

14. The battery box opening structure of the electric vehicle according to claim 12, wherein the driven element comprises a curved toothed rack.

15. The battery box opening structure of the electric vehicle according to claim 6, wherein the support shafts of the battery box are located above a battery box center axis of the battery box extending in the vehicle body front-rear direction.

16. The battery box opening structure of the electric vehicle according to claim 2, wherein the drive device has an electrical power source supplied with a second battery.

\* \* \* \* \*